July 5, 1949.  I. WOLFF  2,475,212
AIRCRAFT INSTRUMENT INDICATOR
Filed May 23, 1947  2 Sheets-Sheet 1
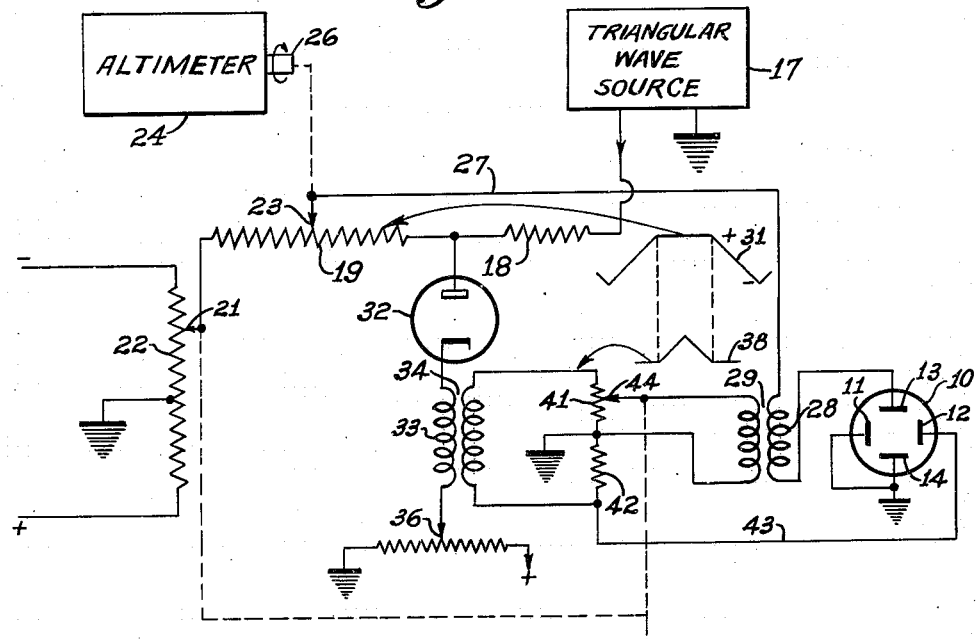
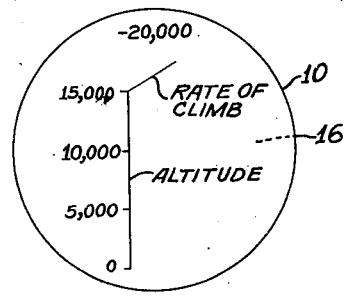
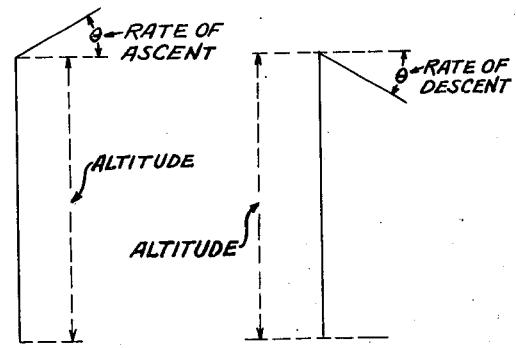
INVENTOR.
Irving Wolff
BY
ATTORNEY July 5, 1949.  I. WOLFF  2,475,212
AIRCRAFT INSTRUMENT INDICATOR
Filed May 23, 1947  2 Sheets-Sheet 2
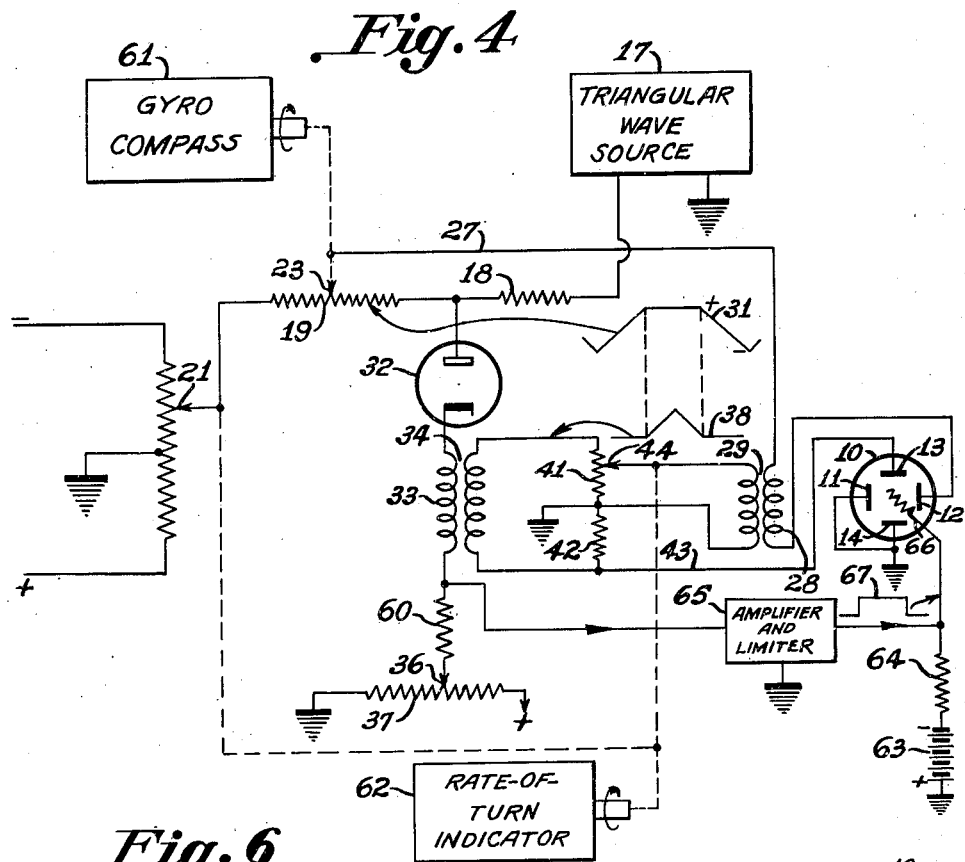
Fig. 4
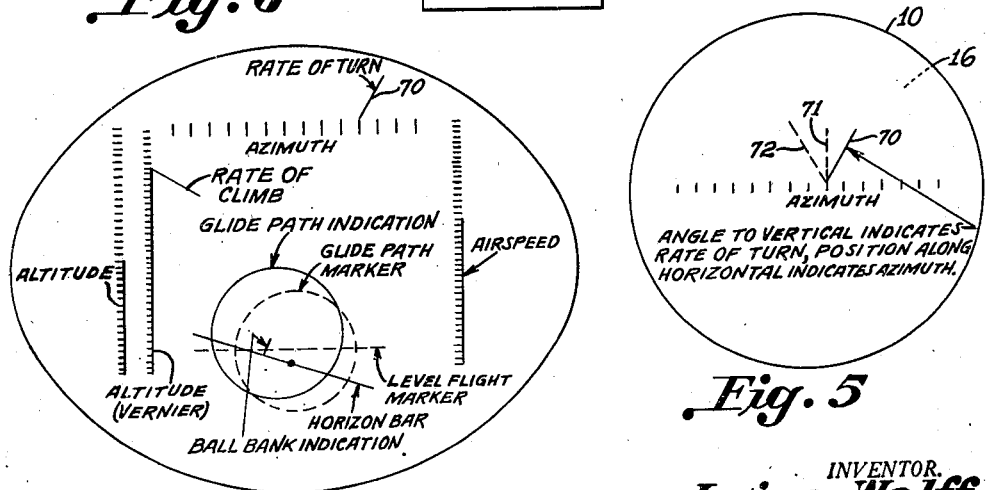
Fig. 6
Fig. 5
INVENTOR.
Irving Wolff
BY
ATTORNEY Patented July 5, 1949

2,475,212

UNITED STATES PATENT OFFICE 2,475,212

AIRCRAFT INSTRUMENT INDICATOR

Irving Wolff, Princeton, N. J., assignor to Radio Corporation of America, a corporation of Delaware Application May 23, 1947, Serial No. 750,147

4 Claims. (Cl. 315—24)

My invention relates to indicating instruments for aircraft and particularly to apparatus for presenting such information as altitude and rate of climb, azimuth and rate of turn, etc.

An object of the invention is to provide an improved method of and means for presenting at one location two indications so that both indications can be read at a glance.

A further object of the invention is to provide an improved means for indicating both altitude and rate of climb.

A still further object of the invention is to provide an improved means for indicating both azimuth and rate of turn.

In a preferred embodiment of the invention a cathode ray indicator tube is employed and the cathode ray is deflected in accordance with the information supplied by two instruments such as an altimeter and a rate-of-climb instrument in the case where altitude and rate of climb are to be presented on the cathode ray screen. In this instance the altitude preferably is shown by the length or height of a vertical trace on the cathode ray screen, and the rate of climb is shown by the angular position of a short trace that starts from the top or terminus of the altitude indicating vertical trace. The value of this angle indicates the rate of climb. The rate of climb is indicated as either positive or negative depending upon whether said short trace is above or below the horizontal.

The azimuth and rate of turn information may be presented in a somewhat similar manner but in this instance it is preferred to turn the presentation 90 degrees so that the azimuth indication is on the horizontal rather than on the vertical. Also, it may be preferred to blank out the azimuth indicating trace so that only the short trace that indicates rate of turn is seen. The position of the end of the short trace at the terminus of the blanked out trace indicates azimuth and the angle of said short trace to the vertical indicates rate of turn.

The invention will be better understood from the following description taken in connection with the accompanying drawing in which, Figure 1 is a circuit diagram illustrating an embodiment of the invention for presenting altitude and rate of climb, Figure 2 is a view showing the screen of the cathode ray tube of Fig. 1 with altitude and rate of climb indications thereon, Figures 3a and 3b are views showing how the altitude and rate of climb indications are to be read, Figure 4 is a circuit diagram of an embodiment of the invention for presenting azimuth and rate of turn, Figure 5 is a view showing the screen of the cathode ray tube of Fig. 4 with azimuth and rate of turn indications thereon, and Figure 6 is a view of a possible instrument panel arrangement that includes the indications shown in Figs. 2 and 5.

In the several figures similar parts are indicated by similar reference characters.

Referring to Fig. 1, this embodiment of the invention includes a cathode ray indicator tube 10 which is of conventional construction and which includes a pair of horizontal deflecting plates 11 and 12 and a pair of vertical deflecting plates 13 and 14. It also includes a phosphorescent screen indicated at 16 in Fig. 2.

In order to provide suitable deflecting voltages, a source 17 of triangular waves, for example, supplies such waves through a resistor 18 and through a potentiometer resistor 19 to ground, preferably by way of a variable tap 21 on a biasing resistor 22.

A variable tap 23 on the resistor 19 is moved along the resistor 19 by an altimeter 24 to a position determined by the altimeter reading. The altimeter 24, for example, may be of a type in which a shaft 26 assumes an angular position that is a function of altitude. A distance measuring device of the FM radio type which may be used as such an altimeter is described in application Serial No. 534,108, filed May 4, 1944, in the name of Royden C. Sanders, Jr., now Patent No. 2,450,991, issued October 12, 1948. Other types of altimeters provided with a servo system may be employed.

The voltage at the tap 23 is applied by way of a lead 27 and the secondary 28 of a transformer 29 to the vertical deflecting plate 13. This voltage has the wave form of a truncated triangle as shown at 31.

The truncated triangle shape is caused by the action of a diode 32 that is connected from the junction point of resistors 18 and 19 to ground by way of the primary 33 of a transformer 34 and by way of a variable tap 36 on a biasing resistor 37. The diode 32 conducts when the triangular wave from source 17 reaches a predetermined instantaneous value so that current flows through diode 32 instead of through resistor 19. If the resistance of 18 is high compared with the resistance of the diode 32 when conducting, the wave 31 will have a flat top as illustrated. The voltage at which the diode 32 starts to conduct is determined by the setting of the tap 36.

Each time the diode 32 becomes conducting, a voltage of the wave shape shown at 38 is applied by the transformer 34 across resistors 41 and 42 which are of equal value and which have their junction point grounded.

It should be understood that the invention is not limited to the use of a triangular wave. A sawtooth wave may be used instead, for example.

The voltage appearing across resistor 42 is applied by a lead 43 to the horizontal deflecting plate 12. A portion of the voltage appearing across resistor 41 is supplied by way of an adjustable tap 44 to the transformer 29, and through the transformer 29 to the vertical deflecting plate 13.

The setting of the tap 44 is determined by a rate-of-climb instrument 45 including a servo which, in the example shown, has a shaft 50 coupled to the tap 44. The shaft 50 assumes an angular position that is a function of the rate of climb and it drives the tap 44 to a corresponding position. Thus the magnitude of the deflecting wave 38 applied to the plate 13 is a function of rate of climb. The tap 44 is on resistor 41 when the rate of climb is positive and it is on resistor 42 when the rate of climb is negative.

The rate-of-climb shaft 50 is also coupled to the bias tap 21. The reason for providing a bias voltage at the tap 21 is to reintroduce the direct-current component of the deflecting wave 38 that is lost at the transformer 38. The error due to loss of this D.-C. component may be small enough to be ignored in which case the left end of the resistor 19 may be connected to ground instead of to the tap 21, the bias resistor 22 being omitted.

It will be seen that during the flat-topped portion of the wave 31 while the cathode ray is being deflected upward a maximum amount by said wave, the additional deflecting voltage wave 38 is being applied to the plate 13 to provide additional upward deflection, and at the same time the voltage wave 38 of fixed value is being applied to the plate 12 to produce horizontal deflection.

The resulting traces on the screen 16 of the cathode ray tube are as shown in Fig. 2 where the vertical altitude trace has a length or height that is a function of the position of the tap 23 as determined by the altimeter 24. The short rate-of-climb trace starts at the upper end or terminus of the altitude trace and makes an angle to the horizontal that is a function of the setting of the tap 44 which setting is determined by the rate-of-climb instrument 45.

The reading in Fig. 2 shows that the aircraft is at an altitude of 15,000 feet and is climbing at a rate indicated by the angle that the short trace makes with respect to the horizontal.

Figs. 3a and 3b further illustrate how the cathode ray traces indicate altitude and rate of climb. In Fig. 3a the aircraft is climbing at a rate indicated by the angle θ. In Fig. 3b the aircraft is descending (negative climb) at a rate indicated by the angle θ.

Figure 4 shows the invention as utilized for indicating azimuth and rate of turn. For this purpose the tap 23 is positioned by a compass such as a gyro compass 61, and the voltage from the tap 23 is applied to the horizontal deflecting plate 12 instead of to the vertical deflecting plate 13. The taps 44 and 21 are coupled to a rate-of-turn indicator 62, and the lead 43 is connected to the deflecting plate 13 instead of to the deflecting plate 12.

The resulting traces on the screen 16 would be the same as the traces of Fig. 2 turned through 90 degrees if the longer trace were allowed to appear on the screen. This longer trace, however, preferably is blanked out so that the resulting indication is as shown in Fig. 5. Such blanking may be obtained by biasing the cathode ray tube 10 to beam cut-off by means of a biasing source 63 that applies a negative voltage by way of a resistor 64 to the control grid 66 of the cathode ray tube 10. The cathode ray is unblocked during the production of the rate-of-turn trace by applying a positive pulse 67 to the grid 66 while the diode 32 is passing current. The pulse 67 may be obtained by means of a resistor 60 connected in the cathode circuit of the diode 32. The signal taken off the resistor 60 is then amplified and clipped by an amplifier and limiter circuit 65.

Referring again to Fig. 5, azimuth is indicated by the position of the lower end of the short trace 70 on the horizontal line. Rate of turn is indicated by the angle that the short trace makes with respect to the vertical. If the aircraft is flying straight ahead the trace is vertical as indicated at 71. If the aircraft is turning to the left the trace is to the left of the vertical as shown at 72.

Figure 6 illustrates one possible instrument panel arrangement where altitude and rate of climb indications and where azimuth and rate of turn indications are provided in accordance with the present invention. Preferably, all the indications shown in Fig. 6 are provided by means of a multi-gun cathode ray tube.

I claim as my invention:

1. In combination, a cathode ray indicator tube having a screen on which an indication is to appear and having vertical deflecting means and horizontal deflecting means for deflecting the cathode ray of said tube, means for producing a periodically recurring deflecting wave that periodically remains at a maximum value for a certain time interval, means for producing a second deflecting wave that occurs during each of said certain time intervals, means for adding said first and second deflecting waves and for applying their sum to one of said deflecting means, means for applying said second deflecting wave only to the other of said deflecting means, means for changing the amplitude of the first deflecting wave as a function of one value to be indicated, and means for changing the amplitude and polarity of the second deflecting wave at at least one of said deflecting means as a function of a second value to be indicated.

2. In combination, a cathode ray indicator tube having a screen on which an indication is to appear and having vertical deflecting means and horizontal deflecting means for deflecting the cathode ray of said tube, means for producing a periodically recurring deflecting wave that periodically remains at a controlled maximum value for a certain time interval, means for producing a second deflecting wave that occurs during each of said certain time intervals, means for adding said first and second deflecting waves algebraically and for applying their sum to one of said deflecting means, means for changing the amplitude of the first deflecting wave as a function of one value to be indicated, means for changing the amplitude of the second deflecting wave as a function of a second value to be indicated, and means for applying to the other of said deflecting means a deflecting wave of constant amplitude that occurs during and only during each of said certain time intervals.

3. In combination with measuring apparatus that supplies a plurality of types of information, indicating apparatus for indicating said information, said indicating apparatus comprising means for producing an angularly displaceable indication whose angular position corresponds to and is a function of one of said types of information supplied by said measuring apparatus, and means for producing a linear indication whose length corresponds to and is a function of another of said types of information supplied by said measuring apparatus, said indicating apparatus further comprising means for superimposing one terminus of said angular indication on one terminus of said linear indication.

4. Indicating apparatus for use with measuring apparatus that supplies a plurality of type of information, said indicating apparatus comprising a cathode ray tube having a screen on which cathode ray traces may be caused to appear, means for producing on said screen an angularly displaceable cathode ray trace whose angular position corresponds to and is a function of one of said types of information supplied by said measuring apparatus, and means for producing on said screen a linear trace whose length corresponds to and is a function of another of said types of information supplied by said measuring apparatus, said indicating apparatus further comprising means for superimposing one terminus of said angular trace on one terminus of said linear trace.

IRVING WOLFF.

REFERENCES CITED

The following references are of record in the file of this patent:

UNITED STATES PATENTS

| Number | Name | Date |
|---|---|---|
| 2,225,046 | Hunter | Dec. 17, 1940 |
| 2,409,462 | Zworykin et al. | Oct. 15, 1946 |
| 2,423,104 | Labin | July 1, 1947 |
| 2,426,218 | Hopgood | Aug. 26, 1947 |
| 2,430,292 | Hershberger | Nov. 4, 1947 |